(No Model.)

E. H. WATROUS.
ANTI RATTLER FOR THILL COUPLINGS.

No. 490,934. Patented Jan. 31, 1893.

Witnesses.
Jesse Heller
Phill C. Masi.

Inventor
Edwin H. Watrous
by E. W. Anderson
his Attorney

UNITED STATES PATENT OFFICE.

EDWIN H. WATROUS, OF PAWLET, VERMONT.

ANTI-RATTLER FOR THILL-COUPLINGS.

SPECIFICATION forming part of Letters Patent No. 490,934, dated January 31, 1893.

Application filed August 16, 1892. Serial No. 443,200. (No model.)

*To all whom it may concern:*

Be it known that I, EDWIN H. WATROUS, a citizen of the United States, and a resident of Pawlet, in the county of Rutland and State of Vermont, have invented certain new and useful Improvements in Anti-Rattlers for Thill-Couplings; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
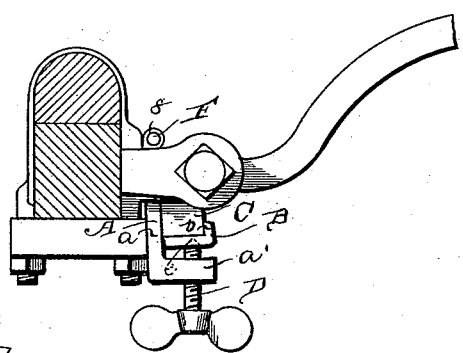
Figure 3:
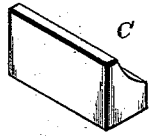
Figure 4:
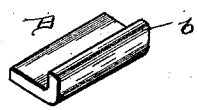
Figure 2:
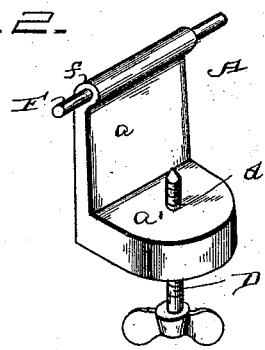

Figure 1 of the drawings is a side view of the invention. Fig. 2 is a detail view of the casting in perspective. Fig. 3 is a detail view of bearing piece and Fig. 4 is a detail view in perspective of the movable seat.

This invention has relation to certain new and useful improvements in anti-rattlers for thill couplings, and it consists in the novel construction and combination of parts, all as hereinafter specified.

The object of the invention is to provide a simple and efficient device of the above named character, which is capable of attachment to a vehicle without the necessity of removing the wheels or shafts, and which can be adjusted to take up the wear of friction.

In the accompanying drawings illustrating the invention, the letter A designates a casting having a vertical plate portion $a$, and a horizontal flange or base $a'$.

B designates a movable seat for the bearing or friction piece C, said seat having a normal support on the base or flange $a'$. The outer edge of the seat is turned or flanged upwardly, as indicated at $b$, in order to retain the bearing piece C in position.

In the base $a'$ is a threaded perforation $d$ which is engaged by a thumb screw or bolt D, from the under side, said bolt being designed to project through and engage a depression or countersink $e$ in the seat B. The bearing block C may be of rubber or other material or composition, suited for the purpose, and its upper edge is concaved, as indicated at $c$ to enable it to closely contact with the thill iron. Said block C at one edge has an upward flange or lip adapted to enter behind the thill iron and between it and the plate $a$, whereby it acts as a wedge to effectually prevent any rattle.

The device is intended to be applied to a shaft coupling or thill joint, as indicated in Fig. 1, by slipping it between the rear of the thill iron and the clip, from the under side, and is retained in place by driving a rivet or pin F through a transverse eye $f$ in the upper end of the plate portion $a$. The bolt or screw is then turned to tighten the bearing piece against the thill iron, and between said iron and the clip. As the bearing piece becomes worn, all that is necessary is to give the screw or bolt a turn, and this can be repeated until the bearing piece is entirely worn off. The bearing is on the under side of the thill eye, and is hidden from sight.

Having described this invention, what I claim and desire to secure by Letters Patent is:

The herein described anti-rattler for thill couplings, comprising the casting A, having a horizontal flange or base $a'$, formed with a screw-threaded perforation therethrough, and a vertical plate portion $a$, adapted to be inserted between the thill iron and clip, the transverse eye $f$ in the upper end of said plate portion, the movable seat-piece B, a set-screw engaging said piece through said perforation in the base, the concaved bearing piece C having an upward lip or flange adapted to enter between the thill iron and plate portion, and the removable pin F detachably engaging the eye $f$ and bearing on the clip lugs, substantially as specified.

In testimony whereof I affix my signature in presence of two witnesses.

EDWIN H. WATROUS.

Witnesses:
CARL N. ROBINSON,
JAMES N. ROBINSON.